United States Patent [19]

Webb

[11] 4,049,104

[45] Sept. 20, 1977

[54] POWER OPERATED TORQUE TOOL

[75] Inventor: George Henry Webb, Berkhamsted, England

[73] Assignee: Desoutter Brothers Limited, London, England

[21] Appl. No.: 676,402

[22] Filed: Apr. 13, 1976

[30] Foreign Application Priority Data

Apr. 30, 1975 United Kingdom ............... 17945/75

[51] Int. Cl.$^2$ ............................................... F16D 43/20

[52] U.S. Cl. ........................................ 192/150; 91/59; 173/12; 192/.034

[58] Field of Search ................... 192/.034, 150; 91/59; 173/12

[56] References Cited

U.S. PATENT DOCUMENTS

| | | | |
|---|---|---|---|
| 3,288,258 | 11/1966 | Taylor | 192/150 |
| 3,289,715 | 12/1966 | De Groff et al. | 192/150 X |
| 3,616,864 | 11/1971 | Sorensen | 192/150 X |

*Primary Examiner*—Allan D. Herrmann

*Attorney, Agent, or Firm*—Toren, McGeady and Stanger

[57] ABSTRACT

In a power operated torque tool, the pressure-fluid feed is controlled by a valve which opens to start the tool, and closes to stop it. This valve is mounted on the end of a push-rod which extends along the axis of the tool. The tool also has a clutch which disengages on reaching a predetermined torque, and at the same time releases a grip on the push-rod, so that the valve can move to close the feed to the tool motor, and thus to stop the tool. The grip on the push-rod is exerted by a group of balls held in a sleeve and pushed against the rod by a tube with a tapered internal wall which surrounds the sleeve. The balls are pushed against the taper by a light spring, which is considerably weaker than the spring which holds the clutch in engagement.

6 Claims, 4 Drawing Figures

POWER OPERATED TORQUE TOOL

The invention relates to a power operated torque tool having an axis and comprising a pressure fluid driven motor, a valve controlling the pressure fluid flow to the motor, a torque responsive clutch having a clutch member adapted to move axially when the torque delivered exceeds a predetermined level, a tubular member carrying the drive from the motor to the clutch, and a push rod extending along the axis of the tool between the clutch and the valve for operating the valve on movement of the clutch member.

There are two known methods of cutting out the drive to the tool bit. In the first, a clutch is provided, and at the predetermined torque the clutch moves axially to disconnect the drive. A tool using this method is shown in our British patent specification No. 1,289,056. With this method the motor continues to run after the drive to the tool bit has disconnected, and therefore wastes compressed air.

In the second method, with which this specification is particularly concerned, a valve in the pressure fluid feed to the motor is closed automatically at the predetermined torque and the tool therefore stops. A tool of this type is described in British patent specification No. 1,263,238. In this specification, a valve operating member is gripped by a number of balls arranged around the operating member and cammed into engagement with the member by a ramped surface. This ramped surface is biased into the operating, rod-gripping position by means of a compression spring which also governs the predetermined level at which the clutch of the tool will disengage. However, since this one spring has to perform two functions the force which it exerts is unlikely to be the ideal force for either object. The spring must be more powerful for the purpose of determining the torque than is necessary for maintaining the gripping balls in engagement with the operating member. This invites unnecessary wear.

It is an object of this invention to avoid unnecessary wear by ensuring that the force applied to the clutch for the purpose of determining the maximum torque and the force applied to the operating member gripping arrangement are both suited to their particular functions.

The invention is characterised by the provision of a sleeve inside the tubular member, which sleeve moves axially with one clutch member when the predetermined torque is developed, a ramped surface on the inside of the tubular member, a plurality of bores in the wall of the sleeve, and gripping members in each of the bores, which can be urged through the bores by the ramped surface in order to grip the push rod inside the sleeve, and on movement of the ramped surface away from the gripping members, to release the push rod.

In addition to the arrangement for closing the air valve at the predetermined torque, the tool may incorporate a clutch device as described in our previously mentioned British Pat. No. 1,289,056. The disengagement mechanism of the tool then has the advantages of both different disengagement mechanisms.

The invention will now be further described, by way of example, with reference to the accompanying drawings, in which.

Figures 1, 2, 3:
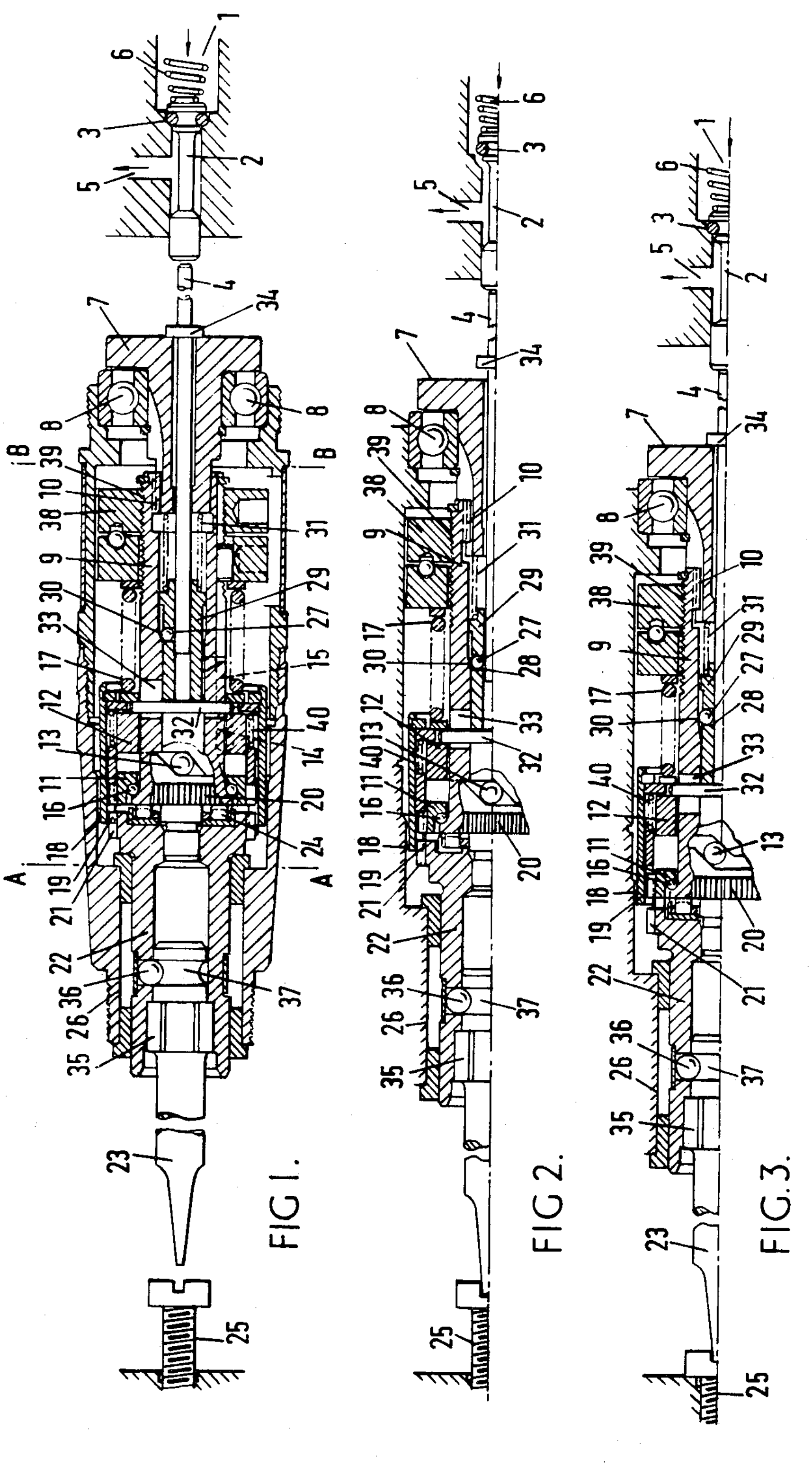
FIG. 1 is a section through a screwdriver according to the invention.
FIG. 2 is a part-section corresponding to FIG. 1, but showing the screwdriver applied to a screw with pressure applied.
FIG. 3 is also a part-section corresponding to FIG. 1, but showing the screw screwed up tight, and the screwdriver stopped, the required torque having been reached.

The screwdriver shown in the figures is driven by a sliding vane pneumatic motor through a gear system, neither of which parts are shown.

The pneumatic motor is fed with compressed air from a duct 1. The air flow is controlled by a valve 2 which sits on a valve seat 3. The valve is opened by a push-rod 4 which lifts the valve 2 off its seat 3 against the pressure of the air in duct 1. Air then passes to the motor along duct 5. A light spring 6 is provided in the duct 1 to keep the valve 2 in place while the tool is not in use. When the push-rod is released the pressure of the air plus the pressure of the spring closes the valve.

The push-rod 4 passes through the centre of the motor and gear system without interacting with them in any way.

The output drive from the gear system is passed to a hollow shaft mounted in bearings 8. A tubular member 9 is splined to the shaft 7 at 10, so that the member rotates with the shaft 7, while being able to move axially relative to it.

Figure 4:
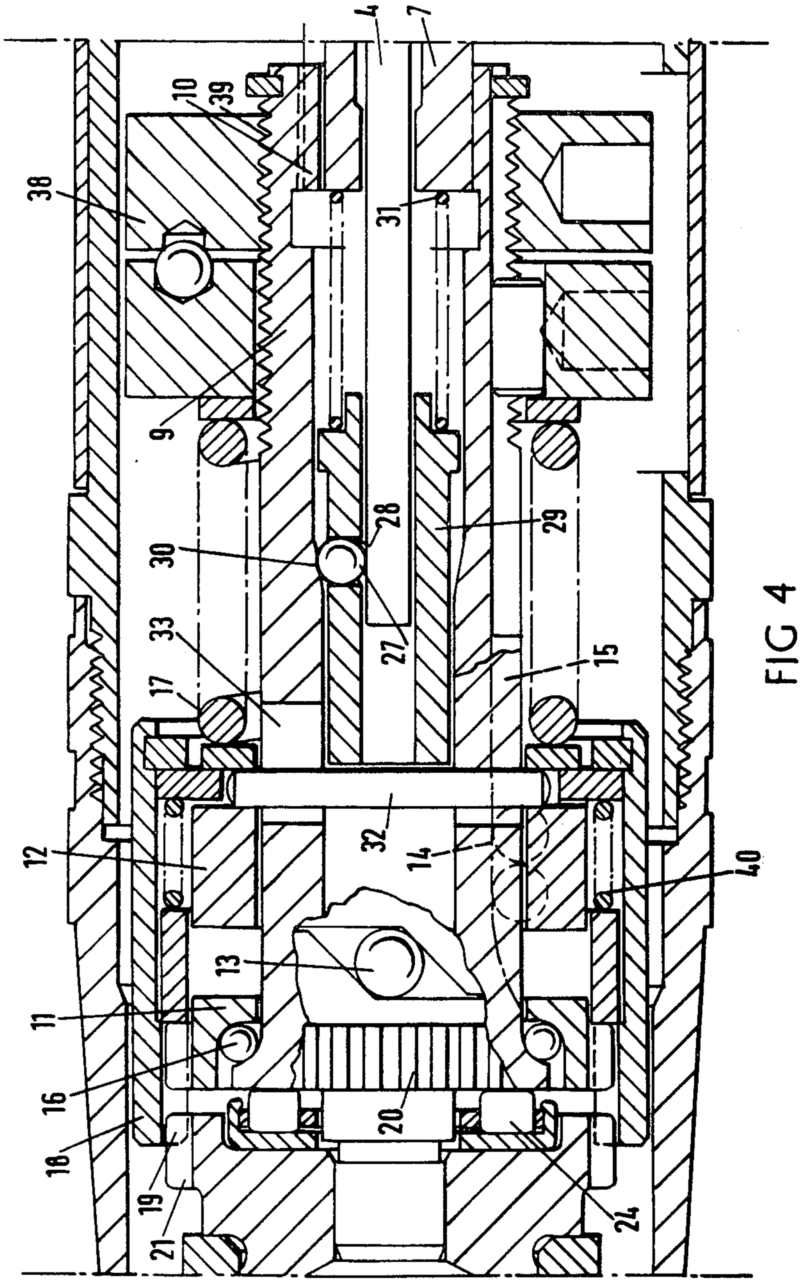
FIG. 4 is a section of FIG. 1 on an enlarged scale, taken between the lines A—A and B—B in FIG. 1.

At the left-hand end of the tubular member 9 is a torque responsive means, to be seen best in FIG. 4, which comprises two parts 11 and 12 of a first clutch which move apart axially at a predetermined torque. In this embodiment, the part 11 is axially immovable, and the part 12 moves away from it. The two parts 11 and 12 have complementary annular ramped surfaces, a ball 13 being inserted in a gap left between the two parts to facilitate the riding up of part 12 on the ramped surfaces. The part 12 is keyed to the tubular member 9 by balls 14 which enter a slot 15. The part 11 rotates with the part 12 due to the engagement of their ramped surfaces, but can also rotate relative to part 12 on the ball bearings 16 when the predetermined torque has been reached.

When the part 12 moves apart from part 11 at the predetermined torque, (to the right in the figure) it moves against the pressure of compression spring 17 and moves with it an annular sleeve 18 forming a part of a second clutch. The sleeve 18 has gear teeth 19 or splines on its inner cylindrical surface, and these teeth mate with corresponding teeth 20 on the outer periphery of the part 11, and with corresponding teeth 21 on the outer periphery of the screwdriver bit holder 22. Thus, when the parts 11 and 12 are close together, the sleeve 18 surrounds the teeth 20 and 21 of both the part 11 and the holder 22 (see FIG. 1) and drive is transmitted to the screwdriver bit 23. When the parts 11 and 12 have moved apart (see FIG. 3), the sleeve 18 of the second clutch is withdrawn from the teeth 21, and thus drive is no longer transmitted to the holder 22. A thrust bearing 24 permits the tubular member 9 to continue rotating without entraining the holder 22. At this stage, the torque drops to zero and the first clutch parts 11 and 12 move together again. However, the sleeve 18 will not re-engage with the teeth 21, because it is being biased towards these teeth only by the light spring 40, and it is rotating at a considerable speed. This nonengagement mechanism is described in full in our British Pat. No. 1,289,056.

It will therefore be seen that when the part 12 moves away from part 11 at the predetermined torque, the drive is disengaged from the screwdriver bit 23. However, this still leaves the motor running and wasting compressed air. This invention provides means for shutting off the motor when the predetermined torque is reached, as will now be described.

The screwdriver shown in FIG. 1 is not operating, while the screwdriver of FIG. 2 is. To get from the position of FIG. 1 to FIG. 2, the screwdriver bit 23 must be pushed against the screw 25 being screwed up, to move the operative parts shown in the figures to the right relative to the tool housing 26, and relative to the shaft 7 where the splining at 10 maintains a driving connection. This movement causes the push rod 4 to be moved to open the valve 2, and thus to admit compressed air to operate the motor.

The left-hand end of the rod 4 is gripped in the operating position by three balls arranged in circumferentially spaced bores 28 in a sleeve 29. The balls 27 are pushed against the rod 4 by a tapered part 30 of the tubular member 9. The sleeve 29 is pushed towards the tapered part by compression spring 31, so that the balls grip the rod.

When the part 12 moves away from the part 11 at the predetermined torque, the part 12 moves a cross pin 32 as well as the sleeve 18. The pin moves axially in a gap 33 in the tubular member 9. The sleeve 29 abuts the pin 32 and is therefore moved to the right, against the pressure of spring 31 so that the balls 27 move away from the tapered part, and are no longer forced against the push-rod 4. The push-rod is therefore no longer gripped at its left-hand end, and the air pressure in the duct 1 plus the pressure of the spring 6 will then close the valve member 2 onto its seat 3, and push the push-rod into the position shown in FIG. 3, to stop the motor.

When the tool is removed from the screw, the spring 31 will return the sleeve 29, surrounding the push-rod 4, back to its starting position. On its way back, the balls 27 in the sleeve 29 will not push the push-rod 4 out of position, because of the collar 34 on the rod which limits its movement to the left. The tool will then be reset ready for performing a new operation.

The screwdriver bit 23 has a hexagonal portion 35 which fits into a hexagonal socket in the holder 22. The bit is held in place by spring-loaded balls 36 which engage a recess 37 in the bit. The screwdriver bit can be exchanged for a bit of any other form.

The push-rod is made in several sections, the sections abutting each other so that a pushing motion can be transmitted, but the rotary motion of one section is transmitted to the next section at a lower rate so that the valve member 2 is not itself required to rotate.

The predetermined torque can be adjusted by moving the rear abutment 38 of the spring 17 which is carried on a thread 39. Alternatively or in addition, the spring 17 can be replaced by one of different characteristics.

I claim:

1. A pressure-fluid operated torque tool having
- a pressure-fluid driven motor,
- a valve controlling the flow of pressure fluid to the motor,
- a torque-responsive clutch having a clutch member adapted to move axially when the torque delivered exceeds a predetermined level,
- a tubular member carrying the drive from the motor to the clutch, and having an internally-tapered portion,
- a push-rod extending centrally through the tubular member,
- a plurality of rod-engaging balls arranged between the tapered portion of the tubular member and the rod, to be forced against the rod by the tapered portion to grip the rod, and
- a cage for supporting the balls, which cage is moved axially by said axially movable clutch member, when the predetermined torque level is reached, to release the grip of the balls on the rod; and below the predetermined torque is biassed by a spring to bring the balls into cooperation with the tapered portion, where they grip the rod.

2. A tool as claimed in claim 1, wherein the cage for supporting the balls is in the form of a sleeve which has three bores therein, each bore supporting one ball.

3. A tool as claimed in claim 2, wherein the torque-responsive axially movable clutch member comprises two halves one of which moves apart from the other along the axis to move the sleeve when the predetermined torque level is reached.

4. A tool as claimed in claim 3, wherein the torque-responsive clutch member controls a second clutch which disengages the drive when the two halves of the torque-responsive clutch member move apart.

5. A tool as claimed in claim 1, wherein the motor is a pneumatic motor.

6. A tool as claimed in claim 1, wherein the push-rod is divided along its length into sections which abut one another to transmit a pushing force, but are not otherwise connected.

* * * * *